United States Patent
Tsuboi

[11] 3,793,573
[45] Feb. 19, 1974

[54] THYRISTOR MOTOR

[75] Inventor: Takashi Tsuboi, Katsuta, Japan

[73] Assignee: Hitachi, Ltd., Tokyo, Japan

[22] Filed: Sept. 28, 1972

[21] Appl. No.: 293,052

[52] U.S. Cl. .................................. 318/227, 321/1
[51] Int. Cl. ............................................ H02p 7/62
[58] Field of Search ...... 318/197, 227, 231; 307/64, 307/66; 321/1, 4, 6

[56] References Cited
UNITED STATES PATENTS

| 3,714,452 | 1/1973 | Williamson | 307/64 |
| 3,515,896 | 6/1970 | Swing | 307/64 |
| 3,229,111 | 1/1966 | Schumacher | 307/66 |

Primary Examiner—Bernard A. Gilheany
Assistant Examiner—Thomas Langer
Attorney, Agent, or Firm—Craig and Antonelli

[57] ABSTRACT

A thyristor motor including an AC motor, a thyristor converter and a controllable DC power source, the special feature of which resides in that there are included means which operate in effect to switch the power supply to the motor between the controllable DC power source and an AC power source, so that the power is supplied from the AC power source when the motor is rotating at a speed lower than a threshold value, but at a speed exceeding the threshold speed, the power is supplied from the DC power source. The advantage obtained is that the current capacity and the breakdown voltage required for the thyrister converter are reduced.

11 Claims, 11 Drawing Figures

THYRISTOR MOTOR

This invention relates to a thyristor motor, that is, an AC motor incorporating a thyristor converter, particularly to the energizing measures of such a motor.

It is generally accepted in the field of motor application that thyristor motors will take the place of DC motors as variable speed motor. As compared with DC or AC commutator motors, thyristor motors are more reliable and have an additional advantage in that they can be easily constructed in the explosion-proof type. The only reason that thyristor motors are still not very extensively used, is the comparatively high price of them. Therefore, it is very important to provide thyristor motors which can be manufactured in reduced cost.

The constitutions of known thyristor motors are generally classified into two major groups. Those belonging to the first group comprise an AC motor and a set of thyristor converter which is connected between the motor and an AC power source and feeds the motor with the AC power in changed frequency. The thyristor motors of the second group include an AC motor, a controlled rectifier which rectifies AC power from a power source and controls voltage of the DC output power, and a thyristor converter which changes the DC power from the controlled rectifier into an AC power to feed the AC motor. The motors of the first group have the advantage that a stable operation is ensured in the starting period as well as at the normal speed, while they have the disadvantage that they require a thyristor converter having large current capacity and a high breakdown voltage rating. On the other hand, the motors of the second group are advantageous in that they require a thyristor converter of comparatively small capacity, but they have the disadvantage that an additional means is required for effecting the inter-phase commutation in the starting period and during low speed running of the motor, said means being unnecessary at the normal speed, and therefore the constitution is more complicated.

The object of this invention is to provide a thyristor motor having a thyristor converter of reduced capacity and hence reduced price.

In order to achieve the above object, the thyristor motor of this invention is constituted by combining the above-mentioned advantages found in the respective groups of the conventional thyristor motors. Namely, in the thyristor motor of this invention, the AC power is supplied to the AC motor through a thyristor converter in the starting period and during low speed operation, the inter-phase commutation or turn-off of the thyristors in the converter being effected by the alternation of the source voltage. However, when the motor reaches the normal speed, the connection is changed so that a rectifier is inserted between the power source and the converter, the turn-off of the thyristors in the converter being effected by the counter-electro-motive force (hereinafter, to be abbreviated as c-emf) induced in the respective phase windings of the AC motor.

This invention will be clarified in the following description given with reference to the accompanying drawings, in which.

For easy understanding of the invention, the constitution and operation of a conventional thyristor motor will be explained firstly.

Figure 1:
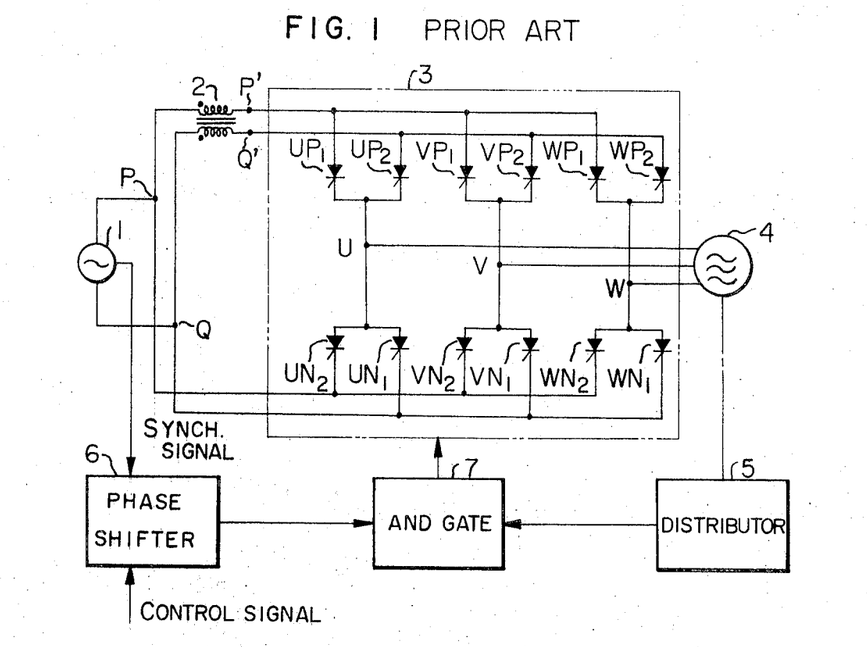
FIG. 1 is a connection diagram of a conventional thyristor motor.

Referring to FIGS. 1 which shows a connection diagram of a conventional thyristor motor of the type belonging to the above-mentioned first group, a thyristor converter 3 which includes thyristors $UP_1 \ldots WP_2$ and $UN_1 \ldots WN_2$ is connected to a single phase power source 1 through a smoothing reactor 2 and the output of the thyristor converter is connected to a synchronous motor 4, while a voltage distributor 5 connected to the motor and a phase shifter 6 connected to the power source and to a source of control signal are connected with an AND gate 7 which produces logic products of the signals from the distributor and the phase shifter and supplies trigger signals to the respective gate electrodes of the thristors.

Figure 2:
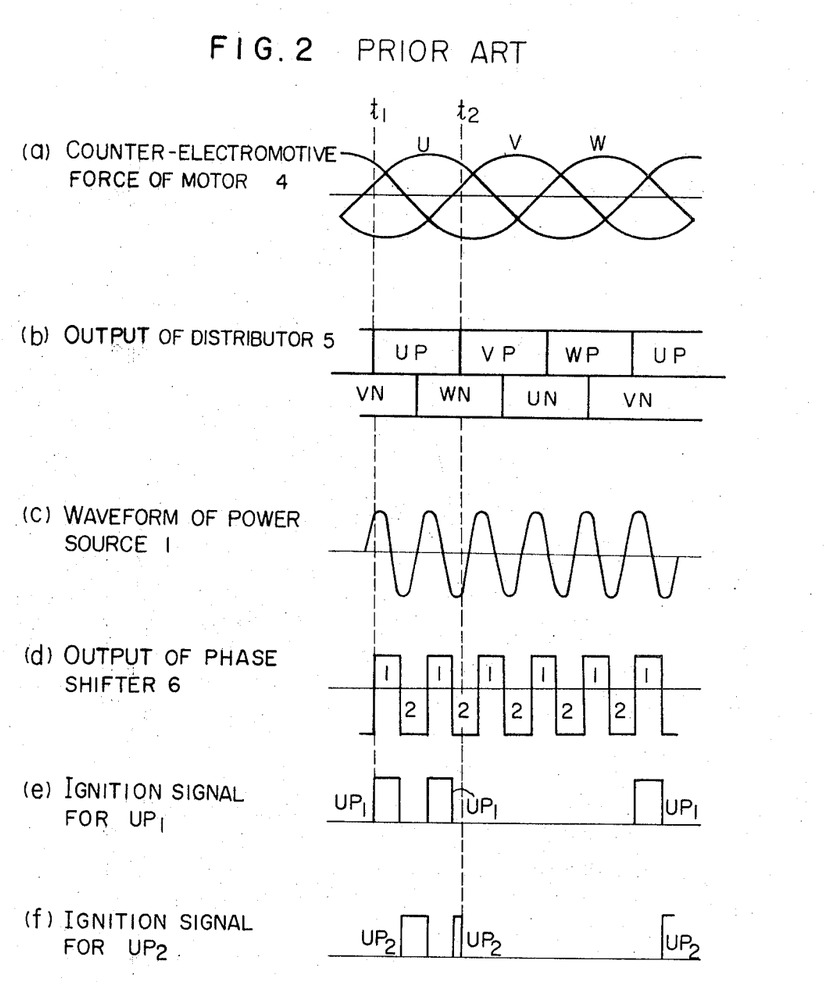
FIG. 2 is a diagram used for explaining the operation of the conventional thyristor motor.

Referring to FIG. 2, explanation is given as to the operation of the thyristor motor shown in FIG. 1 under the condition that the frequency of the c-emf induced in the synchronous motor 4 is lower than the frequency of the power source 1. For simplicity of explanation, consideration is given particularly to U phase of the motor in the following explanation. In FIG. 2, diagram (a) shows the waveforms of c-emf induced in respective phase windings of the AC motor 4 which is rotating, (b) the timing of the output signals of the distributor 5, (c) the waveform of the source voltage, (d) the output signal of the phase shifter 6, (e) the ignition signal for the thyristor $UP_1$, and (f) the ignition signal for the thyristor $UP_2$.

The distributor 5 determines, with respect to the rotary position of the respective phase windings of the AC motor 4, which thyristors of the thyristor converter 3 are to be ignited. Namely, the distributor produces output signals in such a sequence and phasic relationship as shown in diagram (b) with respect to the c-emf of the motor 4 as shown in diagram (a). For example, during period $t_1$ to $t_2$, a pair of thyristors $UP_1$ and $UP_2$ are selected to be ready for being ignited. The phase shifter 6 produces pulse signals as shown in diagram (d) in response to a given control signal to determine the ignition or firing angle of the respective thyristors in relation to the phase of the source voltage shown in diagram (c). When the signals from the distributor 5 and the phase shifter 6 meet at the AND gate 7, the logic product of both signals is led to the gate electrode of the relevant thyristors of the thyristor converter 3 as a trigger signal. For example, in period $t_1$ to $t_2$, ignition signals as shown in diagrams (e) and (f) are given to the gate electrode of the thyristors $UP_1$ and $UP_2$ respectively. As the result, thyristors $UP_1$ and $UP_2$ alternately conduct the load current to the U phase of the AC motor 4 according to the ignition signals.

Here, consideration is given to the inter-phase commutation, that is, the switching of the load current, for example from U phase to V phase. Also referring to FIG. 2, the ignition signal to the thyristor $UP_2$ is cut off at time $t_2$, and instead the ignition signal is given to the thyristor $VP_2$. At this instant, as is seen from diagram (a), the c-emf in the U phase winding of the motor 4 is higher than that in the V phase winding. Accordingly, a current flows through the route of terminal U to thyristor $UP_2$ to thyristor $VP_2$ and to terminal V. This current which is called commutation current, cancels the load current flowing through the thyristor $UP_2$ at that instant and causes the load current to flow through the thyristor $VP_2$. Namely, if the commutation current, which corresponds to a current that flows when the terminals U and V are short-circuited, is larger than the load current at the instant of the switching of the ignition signals, the commutation by the c-emf of the AC motor is achieved.

As the c-emf induced in motor windings is roughly proportional to the motor speed, a larger commutation current is obtained at a higher motor speed. Therefore, the inter-phase commutation is achieved without any difficulty at a comparatively high speed. On the other hand, when there is little or no c-emf induced in the windings as at the starting time of the motor, the inter-phase commutation by c-emf cannot be relied on. However, in a thyristor of the type shown in FIG. 1, the inter-phase commutation can be effected, even at a very low speed, by the aid of alternation of the source voltage. Again referring to FIGS. 1 and 2, for example, if a commutation from thyristor $UP_2$ to thyristor $VP_2$ fails, thyristor $VP_1$ is ignited during the ensuing half cycle of the source voltage, thereby making a circuit through the power input terminal P, thyristor $VP_1$, terminal V, terminal U, thyristor $UP_2$ and the other power input terminal Q. The current flowing through this circuit is sufficiently large to cancel the load current remaining in the thyristor $UP_2$ and extinguish the latter.

As described above, the conventional thyristor motors belonging to the previously-mentioned first group and as shown in FIG. 1, operate satifactorily in so far as it concerns the inter-phase commutation. However, such thyristor motors involve another kind of drawbacks which are responsible for the high price of the conventional thyristor motors.

Figure 3:
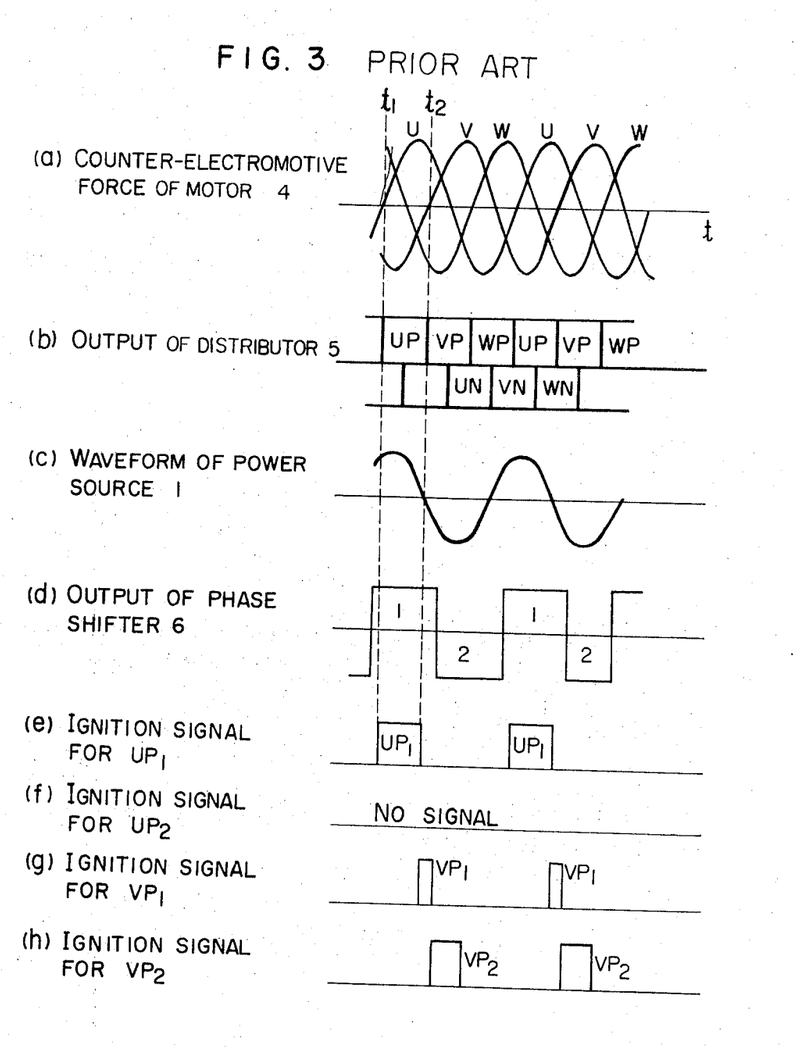
FIG. 3 is a diagram used for explaining problems involved with the conventional thyristor motor.

Considering the operation in the case where the frequency of the c-emf induced in the AC motor coincides with that of the source voltage, the problem will be analyzed with reference to FIG. 3; in which diagram (a) shows the c-emf induced in respective windings of the AC motor 4 which is rotating at such a speed that the frequency of the c-emf is equal to that of the power source voltage, (b) the timing of the output signals of the distributor 5, (c) the waveform of the source voltage, (d) the output signal of the phase shifter 6, and (e), (f), (g) and (h) show the ignition signals respectively for the thyristors $UP_1$, $UP_2$, $VP_1$ and $VP_2$. It will be understood that these ignition signals, being the output of the AND gate 7, are logic products of the output of the distributor 5 as shown in diagram (b) and the output of the phase shifter 6 as shown in diagram (d). Further, in this case, it will be noted that the whole of the load current flowing through the U phase of the motor 4 is borne by the thyristor $UP_1$, while the counterpart thyristor $UP_2$ bears no load current. Thus, the load current is concentrated on either one of the paired thyristors in each phase, if the frequency of the c-emf of the AC motor is equal to that of the source voltage. Such a concentration of the load current may occur in any thyristor in the thyristor converter 3. Therefore, each thyristor in the converter must have sufficiently large current capacity to bear the full load current.

Figure 4:
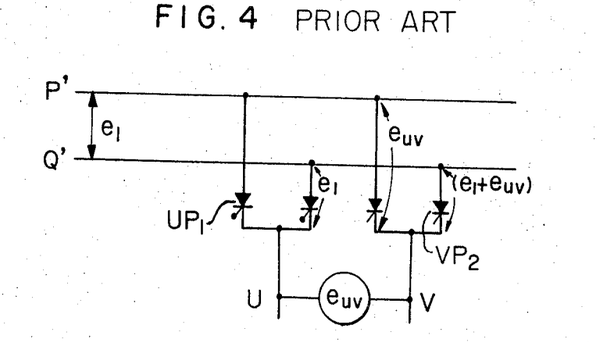
FIG. 4 is a diagram showing a voltage distribution in a part of the conventional thyristor converter.

Moreover, the thyristors used in a thyristor motor as shown in FIG. 1 are required to have a comparatively high breakdown voltage for the following reason. Namely, referring to FIG. 4 which shows a part of the circuit of FIG. 1, voltages across respective thyristors at an instant during the conducting period of the thyristor $UP_1$ are indicated by symbolic characters. It will be seen that the voltage across the thyristor $VP_2$ of the presently unenergized phase v is the sum of the source voltage $e_1$ and the inter-phase $e_{UV}$ of the AC motor 4. Though the voltage $e_{UV}$ is not necessarily synchronous with the source voltage $e_1$, it is always possible that peaks of both alternating voltages coincide. Therefore, magnitude of the breakdown voltage which the thyristors should withstand, must be determined on the basis of the sum of the respective peak values of the source voltage and the motor voltage, the latter voltage becoming higher as the speed of the motor increases.

Thus, the drawbacks of the conventional thyristor motors of the type as shown in FIG. 1 are summarized as follows: (1) Thyristors having normally-excess current capacity must be used. In other words, the utility factor of the thyristors is small. (2) Thyristors must have comparatively high breakdown voltage rating.

The above drawbacks are removed by this invention, and thyristor motors which use thyristors of smaller capacity and lower voltage rating are provided at lower prices.

Figure 5:
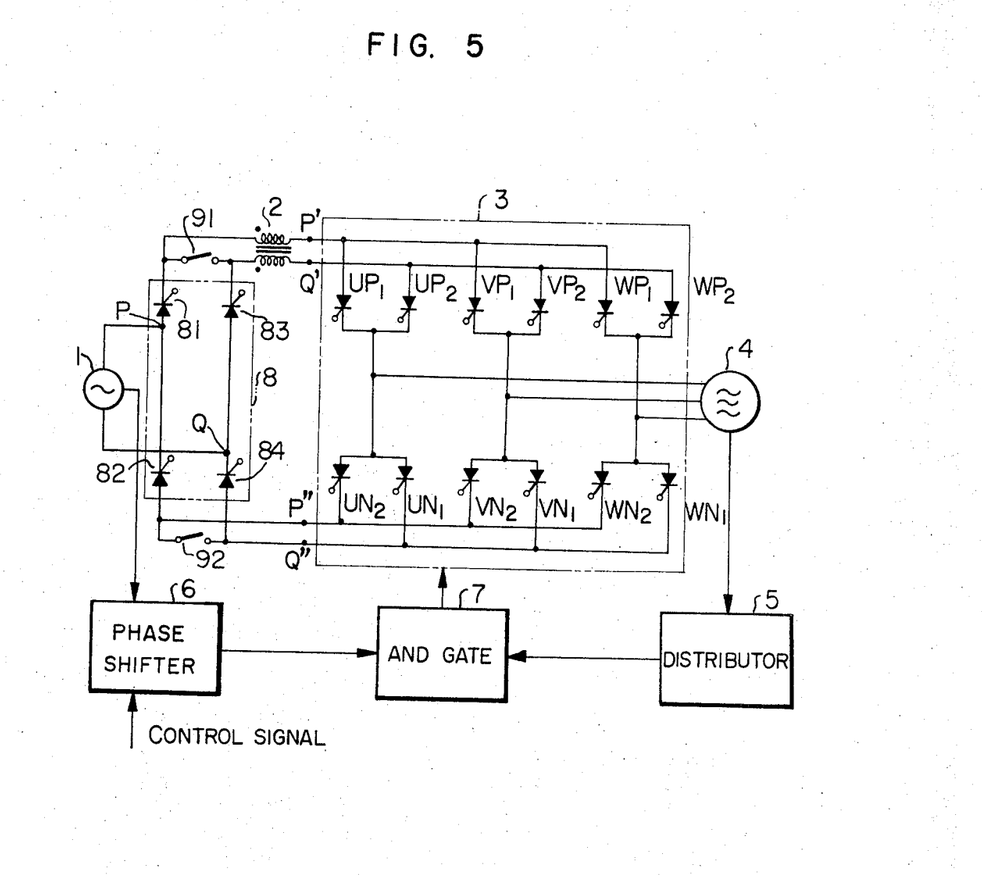
FIG. 5 is a connection diagram of an embodiment of the thyristor motor of this invention.

An embodiment of the thyristor motor of this invention is described hereunder with reference to FIG. 5. The essential difference of this embodiment from the known system shown in FIG. 1 is in the point that the circuit of this embodiment is additionally provided with a rectifier means 8 and switch means 91, 92 between the power source 1 and the thyristor converter 3.

Firstly, it is assumed that the motor 4 is rotating so slowly that the frequency of the c-emf of the motor is lower than that of the source voltage and therefore the inter-phase commutation cannot be effected by the c-emf. The switches 91, 92 are of such a type that it is opened inherently at low speed of the motor rotation. Therefore, the thyristor motor of FIG. 5 operates substantially in the same manner as that shown in FIG. 1 which is not provided with the rectifier means, except that AC power supply is adjustable as the inserted component thyristors are controlled by output of the phase shifter 6. Now, taking the U phase only into consideration, load current flowing through the thyristors $UP_1$ and $UP_2$ is switched between both thyristors at every half cycle of the source voltage, the load current being therefore shared by both thyristors. This is achieved as each thyristor is extinguished by the negative portion of the source voltage. Similarly, the inter-phase commutation or switching is also effected by the alternation of the source voltage. Namely, when the U phase current of the motor 4 disappears as the result of the extinction of the thyristors $UP_1$ and $UP_2$ in the negative period of the source voltage, the distributor 5 does not deliver a U phase signal. Then, as is seen from FIG. 2, the inter-phase commutation, or switching of the load current from the U phase to the V phase to the V phase in this case, is achieved.

Next, it is assumed that the AC motor 4 is rotating at sufficiently high speed to make the interphase commutation by c-emf of the motor possible. The switches 91, 92 are designed so as to close at such a speed of the motor. The closure of the switches is effected by known technique upon detection of predetermined speed or voltage. With closure of the switches 91, 92, the rectifier circuit 8 is effectively inserted between the power source 1 and the thyristor converter 3. Giving consideration only to the U phase, the closure of the switch 91 connects the thyristors $UP_1$ and $UP_2$ in parallel with each other. Accordingly, the current from the now inserted rectifier circuit 8 flows through both of the thyristors $UP_1$ and $UP_2$. Thus, the load current is divided between both thyristors substantially evenly, even when the frequency of c-emf is equal to that of the source voltage, and there occurs no concentration of the load current to one of the thyristor pair as in the conventional circuit shown in FIG. 1.

Moreover, as the closure of the switches 91, 92 joins together points P' and Q' as well as P'' and Q'', voltage imposed across each thyristor of the thyristor converter is no more than the inter-phase value of the c-emf of the motor 4. Therefore, smaller voltage rating is required for the thyristors in this case than in the case of FIG. 1.

In summarizing the above-described embodiment of this invention; when the motor 4 is rotating at such a speed that the inter-phase commutation can be effected by the c-emf of the motor without the aid of the negative excursion in the AC source voltage, a rectifier circuit 8 is inserted between the power source 1 and the thyristor converter 3, and thereby the concentration of the load current to particular thyristors is eliminated and concurrently the voltage rating required for the thyristors is reduced. Moreover, it is possible to control the speed of the motor by controlling the output voltage of the rectifier circuit which is also constituted of thyristors and therefore controllable. Further, regeneration braking of the motor is possible.

Figure 6:
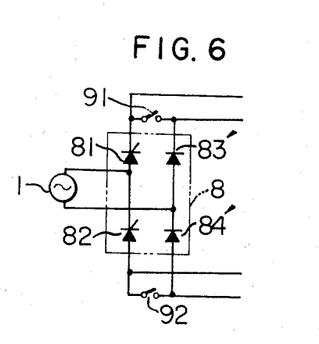
FIGS. 6 and 7 are connection diagrams of modified forms of the rectifier circuit used in the embodiment shown in FIG. 5.

FIG. 6 shows a modification of the rectifier circuit 8 shown in FIG. 5. Thyristors 83, 84 in the rectifier circuit shown in FIG. 5 are replaced by diodes 83', 84'. Similar replacement may be done as to the thyristor pair 81, 83 or 82, 84. Such modifications may be made to lower the cost of the thyristor motor.

Figure 7:
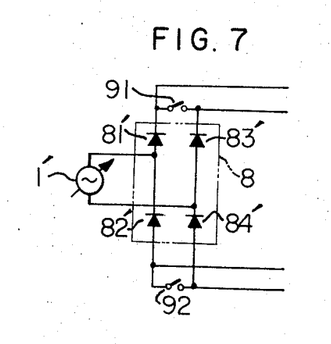

FIG. 7 shows a further modification wherein all thyristors in the rectifier circuit 8 are replaced by diodes 81' to 84' while the power source 1 is replaced by a power source 1' of variable voltage type such as a tapped transformer or an induction voltage regulator. In case a variable power source is already available, this modification is effective to further lower the cost of the thyristor motor.

Figure 8:
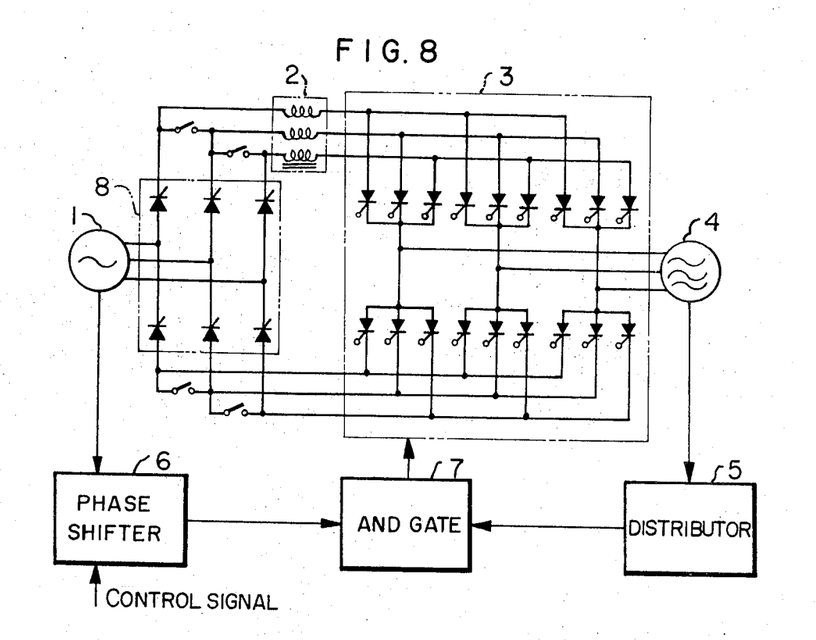
FIG. 8 is a diagram of another embodiment of the thyristor motor of this invention, which is similar in the principle to that shown in FIG. 5 but adapted to a three phase power system.

FIG. 8 shows a three phase version of the embodiment shown in FIG. 5. That is, the circuits and units in the system are constructed for three phase power. In this case too, modification similar to those shown in FIG. 6 and FIG. 7 are possible.

Figure 9:
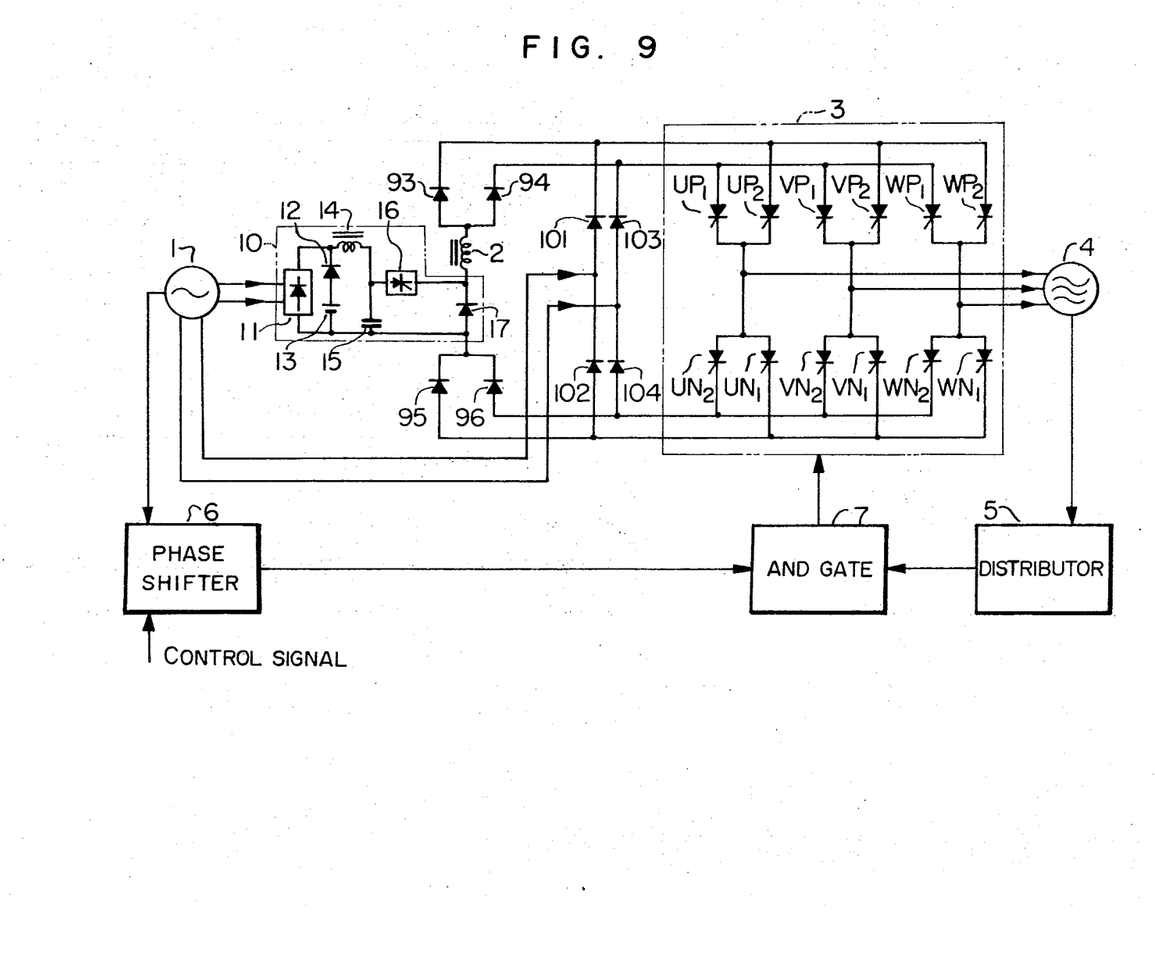
FIG. 9 is a connection diagram of another embodiment of the thyristor motor of this invention.

FIG. 9 shows another embodiment of this invention. The essential difference of this embodiment from the one shown in FIG. 5 is the provision of an AC power route shunting the controllable rectifier circuit instead of the use of switches 91, 92 in FIG. 5.

In FIG. 9, a controllable or variable voltage rectifier circuit 10 typically comprises a rectifier unit 11, a stopping DC diode 12, a battery 13, a reactor 14 and a capacitor 15 for smoothing output of the rectifier unit 11, a chopper 16 for controlling the DC output voltage from the rectifier unit 11 and the battery 13, and a diode 17 which passes current in the period when the chopper 16 is not conducting. Pairs of diodes 93, 94 and 95, 96 are connected in the output of the DC power supply 10 for stopping AC current, while further pairs of diodes 101, 102 and 103, 104 are provided in the AC power bypass for stopping DC current. The other components and connections in the system are essentially the same as those shown in FIG. 5.

In the operation; when the motor is running at low speed or in the starting period of the motor, the chopper 86 is rendered non-conductive to thereby cut off the DC power, while the AC power is delivered to the thyristor converter 3 directly from the power source 1 via the AC bypass, the inter-phase commutation in the thyristor converter 3 being effected by the alternation of the power voltage. When the speed of the motor reaches the normal higher speed and the inter-phase commutation by the c-emf of the AC motor 4 becomes possible, the chopper is controlled so as to increase the output DC voltage of the controlled rectifier circuit 10. Consequently, when the output DC voltage becomes higher than the AC voltage of the power source 1, the stopping diodes 101, 102, 103 and 104 autonomously function to stop the direct energization of the converter 3 with the AC power, and accordingly the power is supplied through the controlled rectifier circuit 10.

Therefore, in this embodiment too, the same effects as in the previous embodiment shown in FIG. 5 are obtained. Namely, the thyristor converter 3 is connected directly to the AC power source for achieving the inter-phase commutation of the thyristors in the starting period as well as during a low-speed running of the motor; but when the speed of the motor reaches a predetermined higher value or the normal operation speed, the power is supplied through the controlled rectifier circuit. Thus, concentration of the load current to particular thyristors in the thyristor converter is avoided, and further, unduly high breakdown voltage is not required for the thyristors. It will be further noticed in this embodiment that if the power fails during operation, DC power will be supplied from the battery 13 to thereby allow a continued operation for a while.

Figure 10:
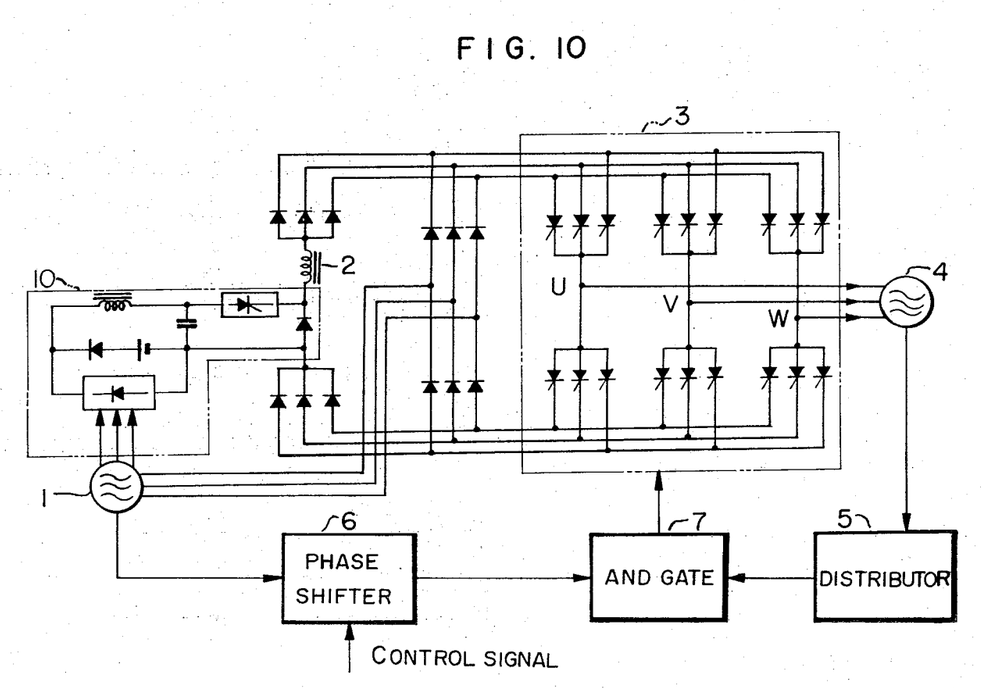
FIG. 10 is a three phase version of the embodiment shown in FIG. 9.

The same principle is applicable to three phase power system as shown in FIG. 10.

Figure 11:
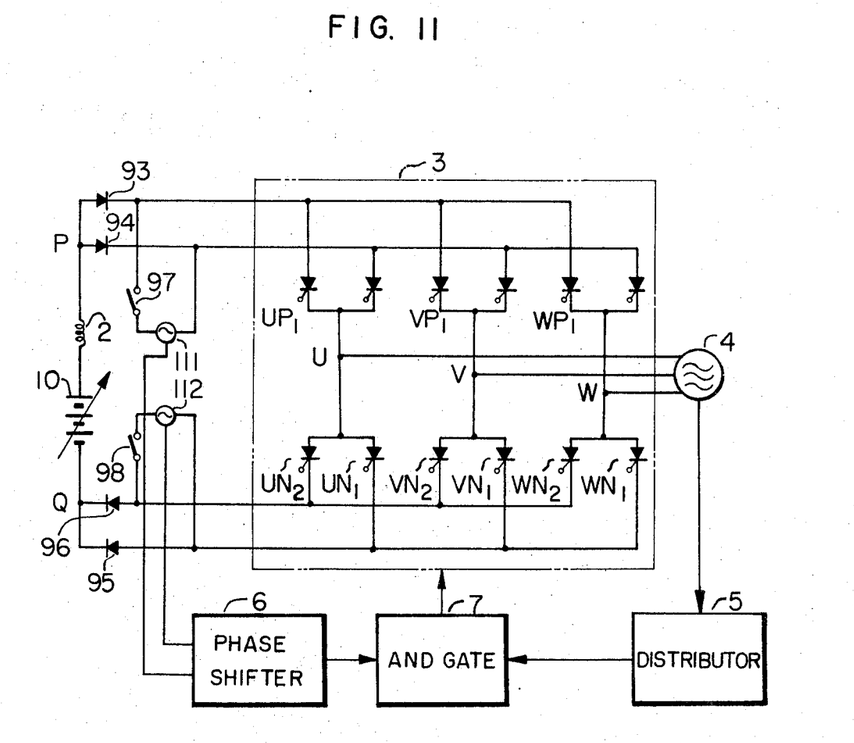
FIG. 11 is a connection diagram of a further embodiment of the thyristor motor of this invention.

FIG. 11 shows a further embodiment of this invention. This embodiment differs from the previous embodiments shown in FIG. 5 and FIG. 9 in the fact that the complete switchover of the power supply from an AC source to a DC source at a certain motor speed as in the previous embodiments is not performed, but a AC voltage is superimposed on the DC source voltage only during low speed running of the motor to ensure the inter-phase commutation, the superimposed AC voltage being removed when the motor speed reaches a predetermined level at which the inter-phase commutation by the c-emf of the running motor is possible.

In FIG. 11, AC power sources 111 and 112 are connected with a controllable DC power source 8 respectively through switches 97, 98. Diodes 93, 94, 95 and 96 are provided for stopping AC currents. The switches 97, 98 are initially closed and are set so as to open at a certain speed of the motor. The remaining components in the system are the same as those shown in FIG. 1, 5 or 9.

In the starting period or in the time when the motor is running at a speed lower than a predetermined value, the AC power sources 111 and 112 are respectively connected between the paired DC power lines through the switches 97, 98. Therefore, the AC voltage from the power sources 111 and 112 are superimposed on the DC voltage from the DC power source 10 and serve to effect the interphase commutation in the thyristor converter 3. As the magnitude of the AC power is only required to be sufficient to effect the commutation, the capacity of the AC power sources may be comparatively small. At a higher speed above the predetermined value at which the commutation by the c-emf of the motor is effective, the switches 97, 98 are opened and the power is supplied exclusively from the DC power source 10.

What we claim is:

1. A thyristor motor comprising an AC motor, a thyristor converter connected to said AC motor for distributing electric power to respective windings of said AC motor in predetermined sequence, an AC power source, a DC power source, and switching means for selectively connecting in effect said thyristor converter either to said DC power source or to said AC power source, said switching means being responsive to the rotating speed of said motor for connecting said thyristor converter to said AC power source when the motor speed is lower than a threshold value and for connecting said thristor converter to said DC power source when the motor speed exceeds said threshold value.

2. A thyristor motor as defined in claim 1, wherein said DC power source comprises a bridge-type full-wave rectifier circuit which consists of pairs of series-connected component rectifiers, the joining point between component rectifiers in each of said pairs being connected to said AC power source, and each end of said rectifier pairs being connected with each other by means of at least one switch constituting said switching means for selectively connecting said thyristor converter to said DC power source or to said AC power source.

3. A thyristor motor as defined in claim 2, wherein all of said component rectifiers in said full-wave rectifier circuit are thyristors.

4. A thyristor motor as defined in claim 2, wherein out of said component rectifiers in said full-wave rectifier circuit, one rectifier of each pair which is found in coordinate arms of the bridge is a thyristor and the other of each pair is a diode.

5. A thyristor motor as defined in claim 2, wherein out of said component rectifiers in said full-wave rectifier circuit, those included in at least one of said rectifier pairs are thyristors and the other are diodes.

6. A thyristor motor as defined in claim 2, wherein all of said component rectifiers in said full-wave rectifier circuit are diodes, and that voltage of said AC power source is controllable.

7. A thyristor motor as defined in claim 1, wherein said DC power source includes rectifying means connected to said AC power source and means for controlling the output of said rectifying means.

8. A thyristor motor as defined in claim 7, wherein said switching means is constituted by said output controlling means, stopping-AC diodes connected between said controllable DC power source and said thyristor converter, and stopping-DC diodes connected between said AC power source and said thyristor converter.

9. A thyristor motor as defined in claim 7, wherein a storage battery is provided in parallel with said rectifying means in said DC power source.

10. A thyristor motor comprising an AC motor, a thyristor converter connected to said AC motor for distributing electric power to respective windings of said AC motor in predetermined sequence, a DC power source connected to said thyristor converter through stopping-AC diodes, and switching means provided between a junction of said diodes and said thyristor converter and an AC power source, said switching means being responsive to the motor speed exceeding a threshold value for disconnecting said AC power source.

11. A thyristor motor as defined in claim 10, wherein said AC power source provides an AC voltage superimposed on the DC source voltage when the motor speed is lower than said threshold value.

* * * * *